Jan. 19, 1965  J. L. PINKARD  3,166,345
METALLIC SEAL ASSEMBLY
Filed June 10, 1960  2 Sheets-Sheet 1
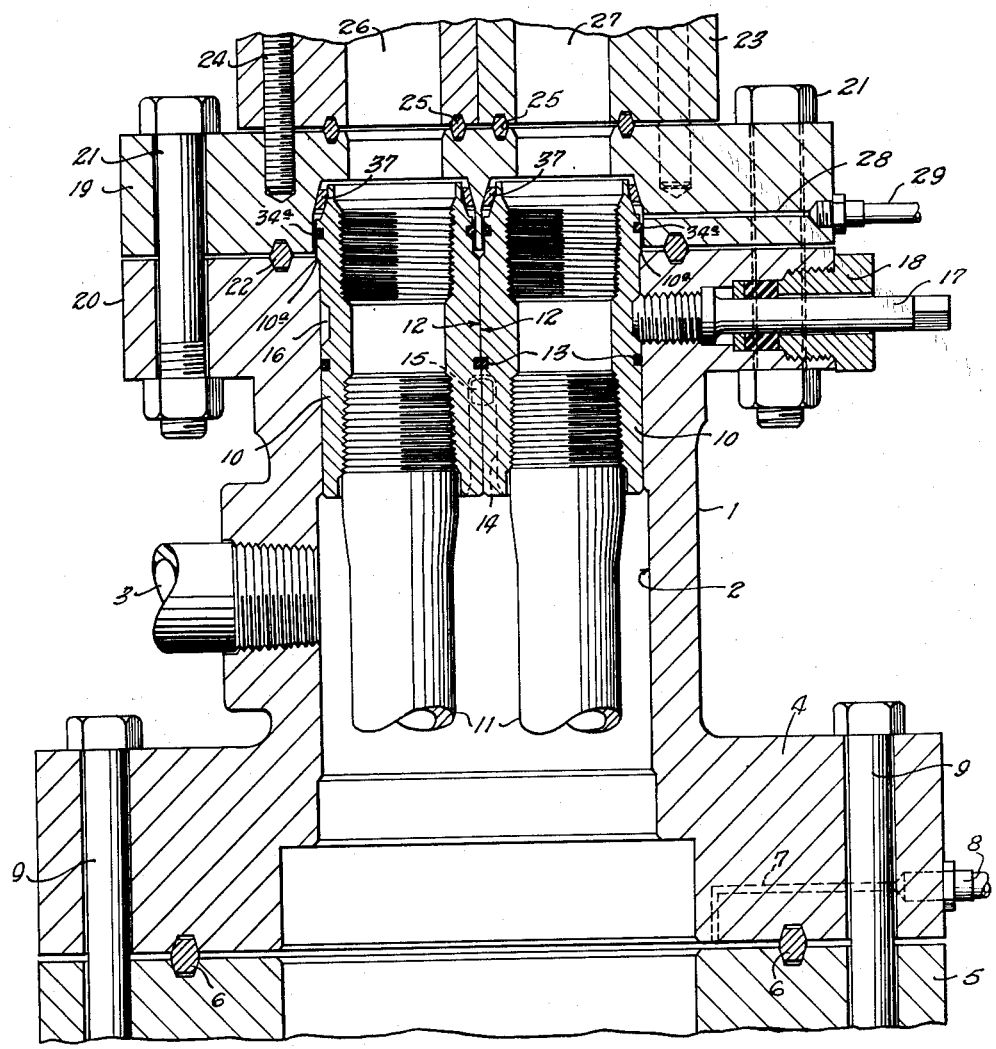
Fig. I
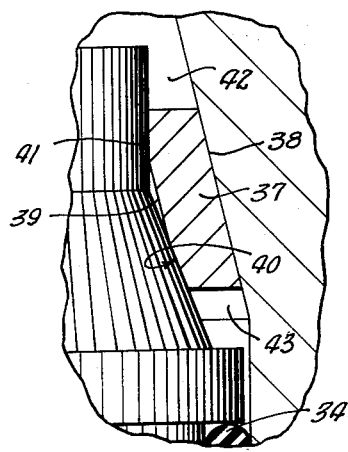
Fig. II
INVENTOR
*Jerry L. Pinkard*
BY *Howard E. Moore*
ATTORNEY

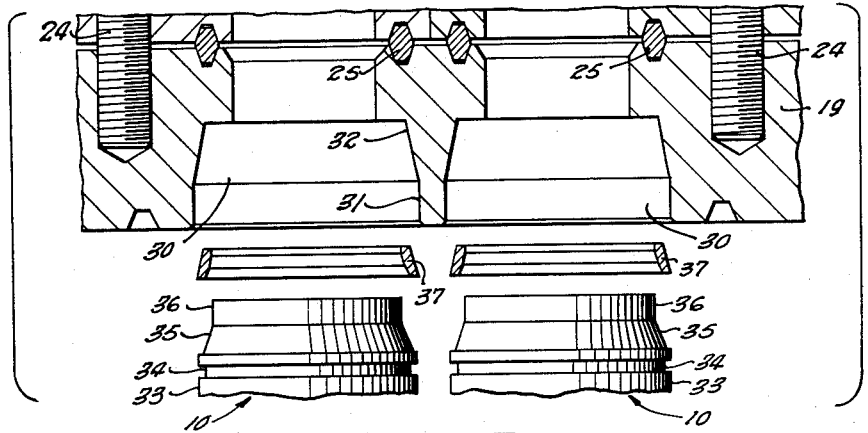
Fig. III
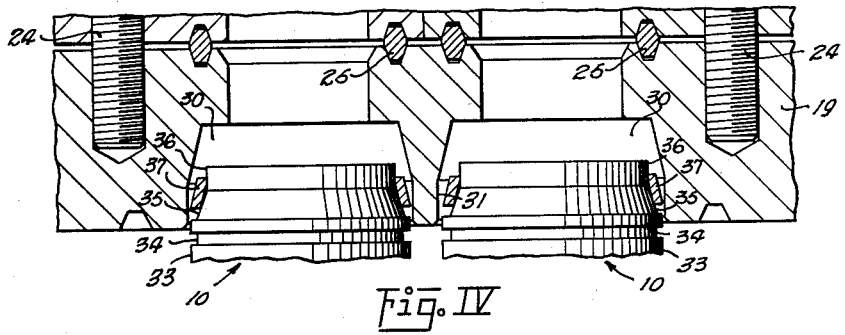
Fig. IV
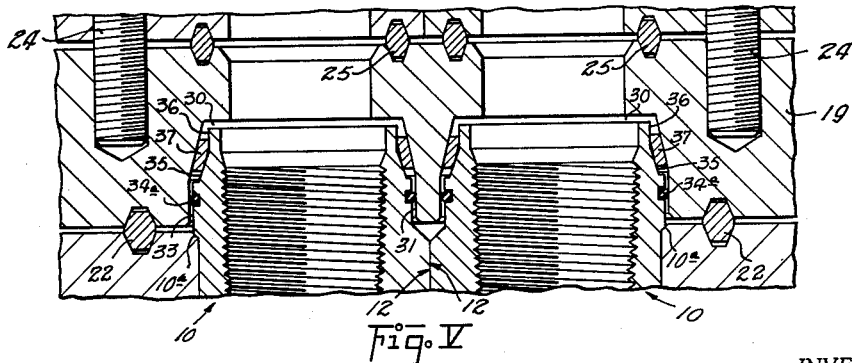
Fig. V

United States Patent Office
3,166,345
Patented Jan. 19, 1965

3,166,345
METALLIC SEAL ASSEMBLY
Jerry L. Pinkard, Fort Worth, Tex., assignor to Rector Well Equipment Company, Inc., Fort Worth, Tex., a corporation of Texas
Filed June 10, 1960, Ser. No. 35,337
2 Claims. (Cl. 285—332.3)

This invention is generally concerned with a sealing device and is particularly concerned with a seal ring employed for sealing between the outer surface of a cylindrical member and a cylindrical recess, or socket, in which the cylindrical member may be inserted.

The improved sealing means including the novel seal ring is particularly useful for sealing between the cylindrical, upwardly extending neck of a tubing hanger element positioned in a tubing head, and a recess or socket of a bonnet flange, which is positioned over the upwardly extending cylindrical neck of the tubing hanger.

As illustrated in this application, the ring is employed with a so-called dual hanger arrangement wherein a pair of "split" dual hangers are suspended in a tubing head and one of such seal rings is employed to seal between the upwardly extending cylindrical neck of each such duel hanger and the recess or socket of the bonnet flange into which it extends.

Considerable difficulty has been encountered in providing an effective seal between the necks of such hanger members and the recess, or socket, of the bonnet flange, employing rings which have been previously in use. Such difficulty has been occasioned by the fact that such rings did not conform to the shape of the hangers and the socket in which they were disposed, and have a tendency to tilt when the elements were brought together, thereby preventing a uniform and effective seal.

Furthermore such seal rings were not arranged to provide a seal between both the casing pressure and the tubing pressure, and had a tendency to be displaced by differential in pressure exerted thereagainst.

The seal ring which forms the basis of the present improvement is so designed and shaped in cooperation with the shape of the upward extension of the hanger and the shape of the socket, or recess of the bonnet flange in which it is disposed, that it does not tilt when the joined elements are brought together, thereby providing an effective and uniform seal. Furthermore it is arranged to seal against both tubing and casing pressure, and will seal tighter when pressure is exerted against it from either direction.

It is, therefore, a primary object of the present invention to provide a metallic seal ring between a bonnet flange and a tubing hanger neck having guide surfaces thereon which in conjunction with corresponding surfaces on the hanger neck, guide the ring into proper sealing position without tilting as it is pressed between the joined surfaces.

Another object of the invention is to provide such a seal ring, which in cooperation with the surfaces on the tubing hanger neck and the recess in the bonnet flange, increases the seal upon pressure being exerted against it from either direction.

Still another object of the invention is to provide such a seal which effectively seals against both tubing and casing pressure.

A still further object of the invention it to provide such a seal which is set wholly by mechanical pressure.

An additional object of the invention is to provide such a seal ring having alignment surfaces thereon, which in cooperation with surfaces on the hanger body neck and in in the recess of the bonnet flange, assure the correct relative positioning of the sealing surfaces when brought into pressure relationship with the joined surfaces.

A suitable embodiment of the invention is shown in the attached drawings, wherein:

FIGURE I is a cross-sectional, elevational view of a well head assembly, showing a pair of dual tubing hangers suspended in a tubing head, and employing seal rings constituting the basis of this improvement to seal about the upwardly extending necks of such hanger members in the recess or sockets in the bonnet flange positioned between the upper surface of the tubing head and the well head or Christmas tree;

FIGURE II is an enlarged partially sectionalized elevational view showing the position of the seal ring with relation to the upwardly extending neck of the tubing hanger and the recess in the bonnet flange when in sealing position;

FIGURE III is an exploded view showing a pair of dual tubing hangers, a pair of seal rings and a bonnet flange in fragmentary and cross-sectional elevational view as such elements would appear before assembly;

FIGURE IV is a view similar to FIG. III, showing the seal ring after having been positioned about the upwardly extended necks of the hanger elements, and while the upwardly extending necks are being positioned within the recesses, or sockets, in the bonnet flange; and FIGURE V is a cross-sectional, elevational view showing the seals about the upwardly extending necks of the hanger elements in sealing position with relation to said necks and the sockets, or recesses, in the bonnet flange.

Numeral references are employed to designate the various parts shown in the drawings, and like numerals designate like parts throughout the various figures of the drawings.

The numeral 1 indicates a tubing head having a central bore 2 therethrough. A conduit 3 communicates with the bore 2 of the tubing head for the purpose of allowing circulation of fluid through the bore of the tubing head and through the casing annulus about the tubing strings extending thereinto, and for the purpose of allowing production of fluid from the casing annulus through such conduit 3.

The tubing head 1 includes an outwardly extending flange 4 at the lower end thereof, which may be joined to the flange 5 of a conventional casing head by means of studs 9 passing through complementary passages in the respective flanges. The opposed faces of the flanges 4 and 5 are sealed by conventional metal ring 6, which are disposed in opposed angularly shaped grooves, said metallic seal ring 6 being compressed into sealing engagement in the grooves when the flanges 4 and 5 are drawn together by the bolts 9.

A suitable test passage 7 is provided through the flange 4 which communicates with a fitting 8 to which a pressure testing device may attached.

Suspended in the tubing head bore 2 are a pair of tubing hangers 10, of the type which are commonly known as "split dual hangers". Said hangers 10 are substantially semi-circular in shape, the outer surface thereof being substantially conformed to the shape of the cylindrical bore 2, and the inner surfaces 12 being flat so as to substantially fill the bore 2 of the tubing hanger 1 when positioned therein. The tubing hangers 10 are suspended in the bore 2 on the complementary shoulders 10a, and are threadedly connected at their lower ends to the strings of tubing 11 which extend into the well and communicate with separate zones of production therein. Such hanger devices may be employed with dual or other multiple completions.

The tubing hangers 10 are sealed between the surface of the bore 2 and between the inner faces 12 thereof by appropriate resilient seal rings 13 extending thereabout.

The hangers 10 are provided with slots 14 on the opposite sides thereof which are arranged to be guided over guide pins 15 extending inwardly of the bore 2, in order to position the hangers 10 within the bore 2 and to prevent the hangers from moving laterally in the bore when one of the hangers is removed therefrom.

The hangers 10 also have hold-down slots 16 extending peripherally about the cylindrical surfaces thereof, and hold-down pins 17 may be threaded inwardly through tubing head flange 20 so that the inner ends thereof will extend into the slots 16, in order to hold the hangers 10 downwardly and prevent them from being moved upwardly by reason of pressure being exerted there-against from below.

The hold-down pins 17 are sealed about by a packing gland 18 which is threaded into the outer end of the bore extending through the flange 20 of the tubing head 1.

An adapter or bonnet flange 19 may be attached to the flange 20 of the tubing head 1 by means of suitable bolts 21 having nuts on both ends thereof, which extend through complementary passages in the respective flanges.

A metal seal ring 22 seals between the faces of the bonnet flange 19 and the flange 20 of tubing head 1 by being compressed in opposed grooves in the faces of such flanges.

Extending above the tubing head and secured thereto is a well flow control fitting, sometimes referred to as a "Christmas Tree," having a flange on the lower end thereof for securing the same to the bonnet flange 19 by means of bolts or studs 24 extending through appropriate passages therein and into the bonnet flange 19.

Appropriate metallic seal rings 25 are disposed between the opposed faces of the bonnet flange 19 and the well flow control device 23.

The well flow control device 23 has appropriate passages 26 and 27 therethrough which communicate with appropriate surface valves and flow passages. These direct fluid produced through the tubing strings 11 to storage facilities or pipe lines.

A test port 28 extends through the bonnet flange 19 in order to test the effectiveness of the seal ring 37 after it has been compressed into place. A suitable fitting 29 is attached to the outer end of the port 28, to which may be attached an appropriate testing gauge.

Bonnet flange 19 has a pair of side-by-side recesses or cavities 30 therein which are generally cylindrical in shape and are arranged to receive the upwardly extending necks 33 on the hangers 10. The necks 33 on the hangers 10 are also generally cylindrical in shape and extend above the upper face of the tubing head 1 when the hangers are positioned in the bore 2 of the tubing head.

The bonnet recesses 30 are arranged to be placed over the upwardly extending necks 33 and brought into sealing relationship thereto as will be hereinafter explained.

Each bonnet recess 30 includes a generally vertical cylindrical surface 31, which is joined to an inwardly angled surface 32.

The upper cylindrical neck on hangers 33 include a seal ring groove 34 thereabout in which an O-ring seal 34a may be disposed for sealing between the inner surface of the bonnet flange recess in the outer surface of the upwardly extending neck portion 33.

The neck 33 also includes inwardly tapered surfaces 35 thereabout and a vertical cylindrical extension 36 extending upwardly therefrom.

The seal ring 37, which is preferably made of slightly malleable metallic material, includes an inwardly angled outer straight surface 38, and an oppositely disposed parallel straight surface 39 on the inner side thereof.

At the lower inner side of the ring 37 is a tapered angled surface which is angularly disposed at substantially the same angle as the surface 35 on the neck 33.

At the upper, inner side of the ring 37 is an annular vertically disposed surface 41 which is arranged to be substantially parallel to the surface 36 on the neck 33.

When assemblying the seal ring 37 to provide a seal between the neck 33 and the inner surface of the recess 30, the seal ring 37 is dropped over the neck 33 so that it assumes the position as shown, with the coinciding surfaces 35 and 40 and 36 and 41 causing the ring to be positioned on the neck 33 in a straight and uniform position. Thus it is not tilted and has no tendency to tilt when the recess 30 is brought downwardly thereover. In other words, the ring is in engagement with the neck 33 at two points by coinciding elongated straight surfaces, so that there is no pivot point provided whereon the ring could tilt in either direction.

Furthermore the outer surface 38 of the ring 37 is substantially parallel to the inner surface 32 of the recess 30, so that when the bonnet flange 30 is lowered to cause the angled inner surface 32 to come into contact with the outer surface 38 of the ring 37, such surfaces contact substantially simultaneously throughout their length and circumference, so that there is no tendency to cause the ring 37 to tilt as pressure is brought thereagainst. Thereby the ring 37 is wedged between the surfaces on the neck 33 and the inner surface 32 of the recess 30, and as so wedged, is in a straight horizontal position so as to provide a uniform seal when the flange 20 and 19 are brought together to compress the seal ring 37.

In FIGURES II and V, the seal ring 37 is shown in sealing position. In such position the ring is compressed and deformed to some extent so as to provide a seal between the surface 32 and 38, the surface on the cylindrical neck 33 and the surface 41 on the ring 37, and the surface 35 on the neck 33 and the surface 40 on the ring 37.

It will be noted that when the ring 37 is in compressed sealing position between the neck 33 and the inner surface of the recess 30, a substantially triangularly shaped area 42 is provided above the seal ring 37, which provides an upwardly converging space so that if a downward force is exerted on the bonnet flange 19 the seal ring 37 will be caused to be compressed more and provide a tighter seal, due to the fact that the upwardly and inwardly angled surface 32 acts against the angled surface 38 on the ring 37, causing an inwardly acting component of force pressing inwardly through the ring against the neck 33 to provide a tighter compressive seal.

Likewise a generally triangularly shaped area 43 is provided below the seal ring 37 and if an upwardly acting force is exerted against the hanger body 10, the cooperating angled surfaces 35 and 40 on the hanger and the ring 37, respectively, causes an outwardly and upwardly acting force component which presses the ring outwardly against the sealing surface 32 to cause the ring to be compressed more and provide a tighter seal.

Furthermore the seal ring 37, when in sealing position as shown in FIGS. II and V, seals against pressure within the tubing strings 11 and against pressure in the casing annulus about the tubing strings 11. In other words, such ring seals against pressure acting in two directions.

It will thus be seen that I have provided a sealing ring which may be positioned about a tubing hanger neck and between same and the recess within the bonnet flange of a well head assembly, without the danger of tilting when the two elements are brought together so as to provide a perfect and uniform seal. It also provides such a seal ring which seals tighter when pressure is exerted against it in either direction. Such seal also seals against pressure acting in two directions, either from the tubing string or from the casing annulus.

Although the seal is disclosed as having particular application in a well head assembly, it will be understood that it could be used for various other applications wherein two elements are to be sealed together, one of which has a cylindrical portion to be inserted in a recess or socket of another element, and are brought into pressure relationship. For instance, it could be used as a seal between a conduit and a fitting attaching same to a tank or container to or from which fluid is to be transferred through the conduit. It would also be apparent that such a seal arrangement would have application in other fields.

Having described my invention, I claim:

1. A seal assembly including a tubular member having a neck portion thereon having an outer angled surface disposed at an acute angle to the axis of said tubular member and a cylindrical outer portion having an end surface parallel to the axis of the tubular member, a member provided with an annular recess therein disposed coaxially about said tubular member, said recess having a surface tapered inwardly at an acute angle toward the axis of the said tubular member, said last mentioned angle being different from said first mentioned angle, said taper being on the inner side thereof, said neck portion being insertable in said recess and being spaced from the wall of said recess when disposed therein, a seal ring of slightly malleable metallic material having an outer surface substantially parallel with the angled inner surface of said recess, a first surface on the inner side of the ring being substantially parallel to the angled surface on the neck, and a second surface on the inner side of the ring being substantially parallel to the surface of the cylindrical end portion of said neck portion, the said seal member being placed in said space between said neck portion and the recess wall, an intermediate surface on the inner side of said seal ring and between said first and second surfaces parallel to said angled inner surface of said recess and bridging that part of the neck where the cylindrical surface meets the outer angled surface whereby said seal ring is adapted to be compressed therein to provide sealing contact in both axial directions with said two surfaces on said neck and with the tapered wall of said recess.

2. The combination called for in claim 1 wherein the tubular member is a tubing hanger and the member containing the recess is a bonnet flange.

References Cited in the file of this patent

UNITED STATES PATENTS

| | | |
|---|---|---|
| 1,014,053 | Dolensky | Jan. 9, 1912 |
| 2,181,343 | Reimschissel | Nov. 28, 1939 |
| 2,794,505 | Allen | June 4, 1957 |
| 2,760,673 | Laurent | Aug. 28, 1956 |
| 3,104,121 | Nordin et al. | Sept. 17, 1963 |

FOREIGN PATENTS

| | | |
|---|---|---|
| 889,819 | France | Oct. 18, 1943 |
| 408,870 | Great Britain | Apr. 19, 1934 |